March 10, 1925. 1,528,774
F. W. KRANZ
METHOD OF AND APPARATUS FOR TESTING THE HEARING
Filed Nov. 20, 1922
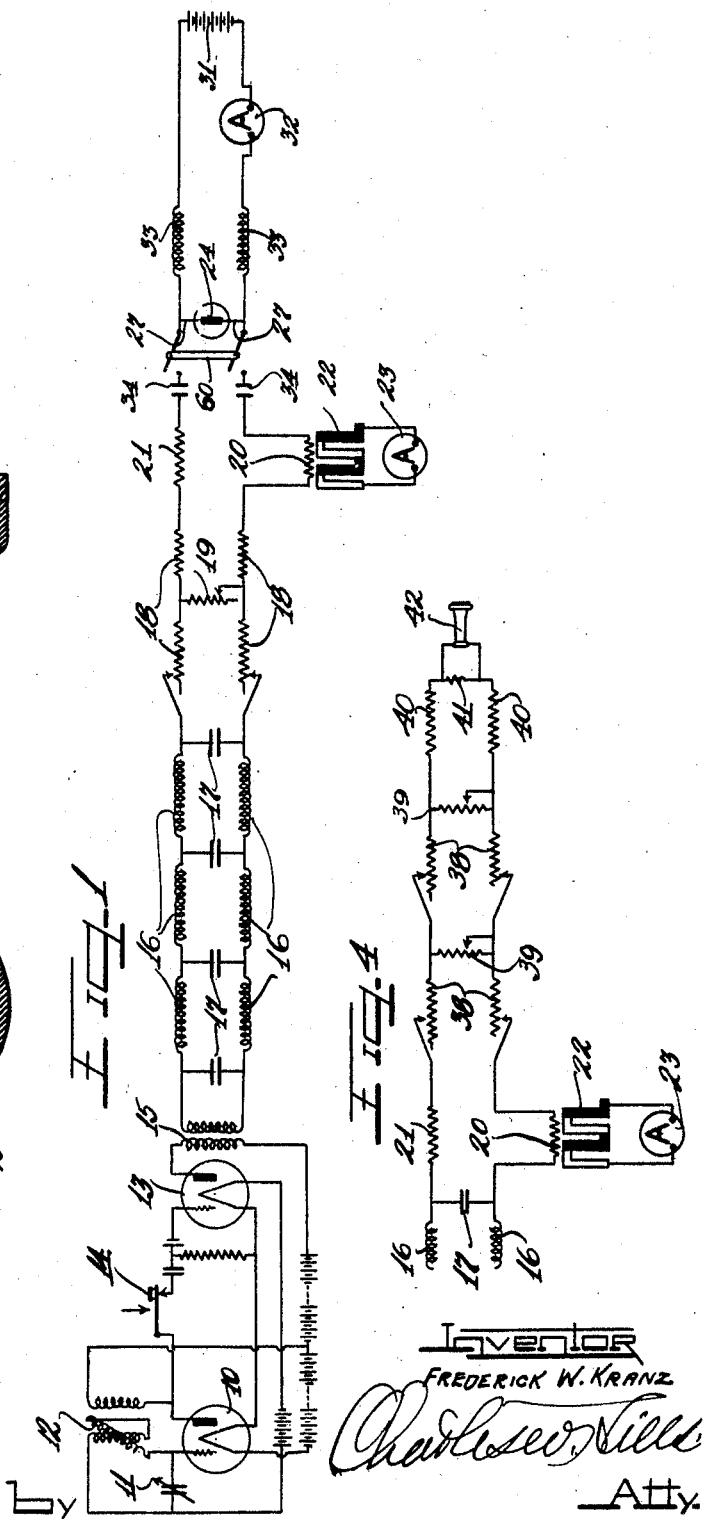
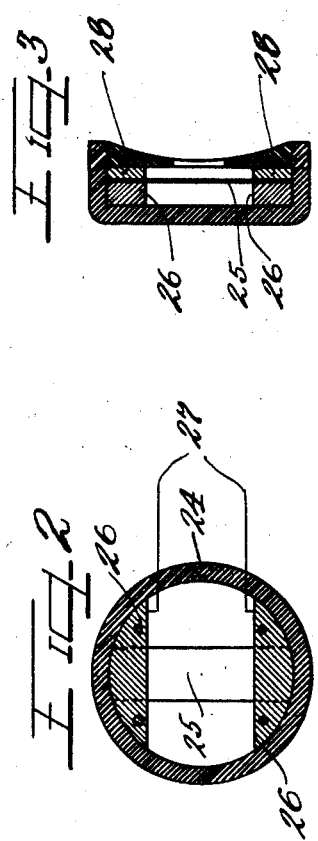
Witnesses
Inventor
FREDERICK W. KRANZ
Atty.

Patented Mar. 10, 1925.

1,528,774

UNITED STATES PATENT OFFICE.

FREDERICK W. KRANZ, OF GENEVA, ILLINOIS.

METHOD OF AND APPARATUS FOR TESTING THE HEARING.

Application filed November 20, 1922. Serial No. 602,021. REISSUED

*To all whom it may concern:*

Be it known that I, FREDERICK W. KRANZ, a citizen of the United States, and a resident of Geneva, in the county of Kane and State of Illinois, have invented certain new and useful Improvements in a Method of and Apparatus for Testing the Hearing; and I do hereby declare that the following is a full, clear, and exact description of the same, reference being had to the accompanying drawings, and to the numerals of reference marked thereon, which form a part of this specification.

In testing the hearing, difficulty has been experienced heretofore in obtaining a reproducible standard of sound, so that the subject whose hearing has been tested by one apparatus might give a decidedly different result when tested by another apparatus, or even when tested by the same apparatus at another time. Another cause of inaccuracy in such tests heretofore has been that there is no certain and dependable relation between the various adjustments of the apparatus and the loudness of the sound produced. Also there has been difficulty in ascertaining the relation between the adjustments and the loudness at different pitches.

It is an object of the present invention to provide an apparatus which shall yield a sound whose loudness can be accurately determined from the adjustments of the apparatus.

It is a further object of this invention to provide such an apparatus which can be accurately reproduced.

It is a further object of this invention to produce a sound-producing apparatus in which the relation between the sound energy and the adjustments of the apparatus may be certainly known for sounds of various pitches.

It is a further object of this invention to provide an apparatus for translating alternating electric current into sound, so that the energy of the sound may be reliably computed from measurements of the current used.

It is a further object of this invention to provide an apparatus which may be used for quickly and readily determining the pitch limits of audition for sounds of various intensities.

It is a further object of this invention to provide apparatus which can quickly and certainly detect any irregularities in the relation between the pitch and the sensitiveness of the subject to sound.

It is a further object of this invention to provide a method by which the presence of such irregularities may be certainly and quickly found with a minimum of labor on the part of the investigator and a minimum of fatigue or other inconvenience on the part of the subject.

Other and further important objects of the invention will be apparent from the disclosures in the accompanying drawings and the following specification.

The invention (in a preferred form) is illustrated on the drawings and hereinafter more fully described.

On the drawings:

Figure 1 is a diagram of a circuit showing one form of my invention.

Figures 2 and 3 are schematic sectional drawings illustrating the sound producing instrument used in this circuit.

Figure 4 is a diagram of a portion of a circuit showing a modification.

As shown on the drawings:

The circuit includes a source of alternating current. I prefer to use for this purpose a generator set such as is frequently used in connection with radio work. It comprises an audion 10 connected in a way which is well understood by workers in the art, with an adjustable condenser 11 and an adjustable inductance 12. The output of this generator is connected to an amplifier which includes an audion 13. The connections may include a key or other interrupter 14 for the purpose of controlling the stopping and starting of the action.

The output circuit of the amplifier is inductively connected as shown at 15 to a circuit which includes a succession of inductances 16 in series and a succession of condensers 17 in shunt. Such arrangements, as is well understood by workers in the electrical art, will, when properly chosen, readily transmit a current of the fundamental frequency delivered by the amplifier but will shunt out harmonics or other higher frequency currents. For this reason, this portion of the circuit is spoken of as an electrical filter.

The output side of the filter is connected to a portion of the circuit including a succession of resistances 18 in series and 19 in shunt. As shown on the drawing, only one resistance 19 across the line is shown, but it is understood that any number that is desired may be used. Some or all of the resistances 18 may be adjustable and the resistances 19 likewise may be adjustable. If desired, the adjustment may extend to the complete elimination of some of the units consisting of a resistance 18 in each line and a resistance 19 across the lines. Also known resistances may be added either in series or in parallel when desired. When the series resistances are changed, it is necessary to keep the resistance of the two sides of the line of nearly equal resistance to ensure proper balancing. It is the function of this part of the circuit to regulate the intensity of the electrical oscillations arriving at the sound producing instrument. It does this by causing a predetermined diminution in the energy and is consequently called the attenuator. The resistances therein are adjusted until the desired degree of attenuation is secured. A very convenient arrangement, but one which is not essential to the invention, is to have these resistances arranged in sets, each set corresponding to a definite percentage of attenuation. The several sets can then be so connected that each is put into or removed from the circuit by the movement of a single switch handle.

From the inductive connection 15 up to this point in the circuit, the arrangement is symmetrical, each inductance 16 being matched by an equal inductance 16 in the other line, and the capacities 17 being connected between the inductances. In the same way, each resistance 18 is matched by a like resistance 18 in the other line and the shunts 19 are connected between the resistances 18.

At 20 there is introduced into one line an arrangement for measuring the current. Preferably a non-inductive arrangement is used, and a resistance 21 is placed in the other line to balance this non-inductive resistance. The current measuring instrument chosen consists of a heating element shown at 20, which acts to heat the junctions of a thermo couple 22 which is connected to a delicate galvanometer or microammeter 23.

Either in place of the key 14 or in addition to it, a switch 60 may be inserted just in front of the sound producing device. In order to keep the circuit symmetrical, a double pole switch is used.

At 24 there is shown connected across the line an instrument for producing sound from the electrical oscillations. The instrument which I have chosen for this purpose and which is known as a thermo-phone has been selected because it is possible to compute in dynes per square centimeter the pressure changes produced by this instrument when the energy of the electric current delivered to it is known. From values thus obtained, the sound energy may be calculated. The relations between the two depend on constants of the instrument which may be determined from its physical characteristics and so may be predicted with certainty. The thermo-phone consists of a strip of platinum 25 which is very thin. Preferably its thickness does not exceed .0002 centimeters. This strip is mounted in brass clamps 26 to which the wires 27 are connected. The strip 25 is enclosed in a chamber. This chamber may conveniently take the form of a telephone receiver. Current through the strip 25 heats it and so heats the air in the chamber. The temperature and so the pressure of this air therefore changes with changes in the current. When the instrument is held to the ear, these pressure changes are communicated to the eardrum through the open side of the chamber. The pressure within the chamber being a function of the temperature, the pressure changes may be accurately computed from the measurements of the current. As the heat produced is proportional to the square of the current, the heat changes will be larger and follow the current changes more faithfully if the alternating current is superposed on a direct current. This direct current is supplied by a battery 31 and measured by an ammeter 32. The alternating current from the transformer 15 is prevented from reaching the battery and ammeter by inductances 33, and the constant current from the battery 31 is prevented from reaching the microammeter 23 by capacities 34 inserted in each line.

For working with very deaf subjects or for investigating sounds near the upper or lower pitch limit of audition, it is preferable to use a telephone receiver instead of the thermo-phone, because the telephone receiver gives a much louder sound. The constants of the telephone receiver, however, may not be predicted with certainty and consequently each such receiver must be calibrated by comparison with a thermo-phone before it is used. When a telephone receiver is to be used, the circuit is modified as illustrated in Figure 4 in which the inductances 16 and the capacity 17 farthest from the transformer 15 are shown at the left of Figure 4. Adjustable resistances 38 in series in each side of the line and adjustable resistances 39 across the line corresponding respectively to the resistance 18 and 19 are provided in this modification, but they are preferably placed upon the other side of the measuring instrument 20 and its balancing resistance 21, because the current used through a telephone receiver is so small compared with that used through a thermo-phone that difficulty would be experienced in measuring it directly. The microammeter 23, placed in the situation shown in Figure 4, measures a current which is very large compared with the current flowing through the telephone receiver, but the ratio between the two is easily computed from the resistances.

To facilitate the calculation of the amount by which the electrical current is attenuated by the resistances 38 and 39, it is important that the part of the circuit beyond the last shunt 39 should have a constant resistance. The impedance of a telephone receiver is not pure resistance and moreover this impedance varies with the frequency. Therefore the telephone receiver is shunted by a small resistance 41. This small resistance 41 is in series with larger resistances 40 of such magnitudes as to bring the whole resistance of the circuit up to the value wished. Thus the impedance of the telephone receiver has only a small effect on the circuit as a whole, and this latter has practically a constant resistance.

In an exemplification of this circuit which I have found useful, each of the resistances 40 was about 97 ohms, while the resistance 41 was 6 ohms, which gave to the combination of resistances 40, 41 and telephone receiver 42 a substantially constant resistance at all frequencies of approximately 200 ohms.

In the operation of the device, in the circuit shown in Figure 1, the generator and amplifier set up oscillatory electrical currents in the transformer 15. The frequency of these oscillations is adjusted in large steps by turning the dial of the adjustable capacity 11. The finer adjustments of the frequency are effected by means of the adjustable inductance 12. The electrical filter made up of properly chosen inductances 16 and capacities 17 separates from the output of the transformer 15 all frequencies except the fundamental. Series resistances 18 and the shunt resistances 19 cause a dissipation of part of the energy of the electrical oscillation or in other words this part of the circuit acts as an attenuator. These resistances are adjusted until the reading of the microammeter 23 shows that the input into the thermo-phone is of the desired size. The current from the battery 31 is determined by the ammeter 32 and the temperature of the platinum strip 25 is thus obtained. From the reading of the microammeter 23 and the ammeter 32, therefore, the pressure changes produced by the thermo-phone may be determined.

The apparatus may be used by leaving the frequency adjustments at 11 and 12 constant, varying the adjustments at 18 and 19 for intensity changes until the limit of audibility for the particular frequency is found. The adjustments at 11 and 12 may then be changed to elect a different frequency and the exploration by means of the adjustments at 18 and 19 repeated.

While the apparatus described is available for this method, a better method is as follows: The operator adjusts the capacity 11 so that the range of frequencies which he wishes to investigate may be produced by changes in the inductance 12. He then requests the subject who is listening to the sounds from the thermophone 24 or telephone receiver 42 to vary the frequency back and forth over this frequency range by means of the handle controlling the inductance 12. The operator adjusts the resistances 18 and 19 so as to give a definite sound energy output, and the subject, by means of his control of the inductance 12, determines over what portions of the frequency range, if any, the sound is audible. By noting the adjustment of the indicator on the inductance, the operator can determine the frequencies of the audible portions of the frequency range and from the readings of the microammeter and also of the resistances 18 and 19 in the case of the use of the telephone receiver, he can determine the intensity of the sound. The operator then adjusts the resistances 18 and 19 so as to change the sound intensity by a definite known amount and the subject again determines what portions of the frequency range are audible, and readings are again taken to determine the frequencies and intensities of these portions, and so on. A preferred method of procedure is to have the first adjustment of the resistances 18 and 19 such that the sound intensity is not sufficient to be audible to the subject at any point in the frequency range, and succeeding adjustments of the resistances to be such that the intensity is increased in regular steps until all of the frequency range is audible, observations being made by the subject after each change of intensity. By noticing whether or not he can detect a stopping and starting of the sound corresponding to the opening and closing of the key 60, the subject can make a test as to whether a given intensity is beyond the limits of audibility. Sometimes a subject displays marked and abrupt changes in sensibility to sounds with changes of pitch, and this method of testing is much more adapted to the discovery and exploration of these irregularities than a method dependent on changes of intensity using a series of constant pitches.

When the subject is a very deaf person or when the sounds being investigated are of such low pitch or of such high pitch as to be very near the pitch limit of audibility, the arrangement shown in Figure 4 is used instead of that shown in Figure 1. The procedure, however, is the same except that instead of the reading of the microammeter 23 giving directly the input into the sound producing instrument a fraction only of the current shown by the microammeter 23 reaches the telephone receiver 42, this fraction being calculable from the values of the resistances 18 and 19. The telephone receiver itself, as already explained, must be calibrated by comparison with a thermophone.

I am aware that numerous details, both of the apparatus and of the method, may be varied through a wide range without departing from the spirit of this invention, and I therefore do not purpose limiting the patent granted otherwise than is necessitated by the prior art.

I claim as my invention:

1. In an apparatus for investigating hearing, a sound producing device capable of giving off sound energy bearing a predetermined ratio to the energy imparted to said device, means for imparting energy to said sound producing device, and means for measuring the energy thus imparted.

2. In a sound producing device, a generator of electrical alternating current, means for measuring the energy of said alternating current, and means for transforming the energy of the electrical alternating current into sound energy, the latter means having a known transformation ratio.

3. In a device of the class described, means for generating electrical alternating currents, means for adjusting the frequency of said alternating currents, means for amplifying said alternating currents, connections between the two including means for starting and stopping the operation, means for separating from the amplified alternating currents all alternating currents of a frequency different from that for which adjustment is made, adjustable means for attenuating the electrical alternating current, means for measuring the energy of the attenuated alternating current, and means for transforming said alternating current into sound energy.

4. In combination, a generator of electrical alternating current, an electrical filter, an attenuating circuit, means for producing sound from electrical alternating current, and a device for measuring the electrical energy of said alternating current.

In testimony whereof I have hereunto subscribed my name in the presence of two subscribing witnesses.

FREDERICK W. KRANZ.

Witnesses:
CARLTON HILL,
OSCAR HARTMANN.